United States Patent
Liu et al.

(10) Patent No.: US 8,204,377 B2
(45) Date of Patent: Jun. 19, 2012

(54) SYSTEM, METHOD AND APPARATUS FOR JOINT SELF PHASE MODULATION COMPENSATION FOR COHERENT OPTICAL POLARIZATION-DIVISION-MULTIPLEXED ORTHOGONAL-FREQUENCY DIVISION-MULTIPLEXING SYSTEMS

(75) Inventors: Xiang Liu, Marlboro, NJ (US); Robert William Tkach, Little Silver, NJ (US)

(73) Assignee: Alcatel Lucent, Paris (FR)

( * ) Notice: Subject to any disclaimer, the term of this patent is extended or adjusted under 35 U.S.C. 154(b) by 743 days.

(21) Appl. No.: 12/288,794

(22) Filed: Oct. 23, 2008

(65) Prior Publication Data
US 2010/0104284 A1  Apr. 29, 2010

(51) Int. Cl.
  *H04J 14/06* (2006.01)
  *H04B 10/00* (2006.01)
(52) U.S. Cl. .......................... 398/65; 398/158
(58) Field of Classification Search .............. 398/182, 398/202, 65, 152, 184, 205, 42, 43, 47, 48, 398/79, 209, 208, 158
See application file for complete search history.

(56) References Cited

U.S. PATENT DOCUMENTS

| | | | | |
|---|---|---|---|---|
| 5,982,763 A * | 11/1999 | Sato | | 370/342 |
| 6,915,084 B2 * | 7/2005 | Ho et al. | | 398/208 |
| 7,623,796 B2 * | 11/2009 | Liu | | 398/202 |
| 2003/0090768 A1 * | 5/2003 | Liu et al. | | 359/183 |
| 2008/0130779 A1 * | 6/2008 | Levi et al. | | 375/267 |
| 2010/0247099 A1 * | 9/2010 | Lowery et al. | | 398/79 |

OTHER PUBLICATIONS

Sander L. Jansen, Long-haul transmission of 16×52.5 Gbits/s polarization-division-multiplexed OFDM enabled by MIMO processing (Invited), Feb. 2008 / Journal of Optical Networking / vol. 7, No. 2 /.*
Lowery, Arthur James, Fiber nonlinearity pre- and post-compensation for long-haul optical links using OFDM, Optics Express 12965, vol. 15, No. 20, 6 pages, Oct. 1, 2007.

* cited by examiner

*Primary Examiner* — Kenneth N Vanderpuye
*Assistant Examiner* — Abbas H Alagheband
(74) *Attorney, Agent, or Firm* — D. M. La Bruno

(57) ABSTRACT

System, apparatus and method of optical communication are provided for performing digital compensation of the self-phase modulation (SPM) effect experienced by a polarization-division multiplexed (PDM) orthogonal frequency-division multiplexed (OFDM) signal in fiber transmission by compensating a complex digital waveform representing one orthogonal polarization component of the optical PDM-OFDM signal based on both digital waveforms representing two orthogonal polarization components of the PDM-OFDM signal. The compensation of the digital waveform may be further based on an anticipated mean total nonlinear phase shift experienced by the signal during fiber transmission due to SPM. The compensation may be divided into pre-compensation at the PDM-OFDM transmitter and post-compensation at the PDM-OFDM receiver. The fiber transmission link preferably includes a pre-dispersion compensation module, distributed inline dispersion compensation modules, and a post-dispersion compensation module arranged in a judiciously chosen manner.

20 Claims, 1 Drawing Sheet

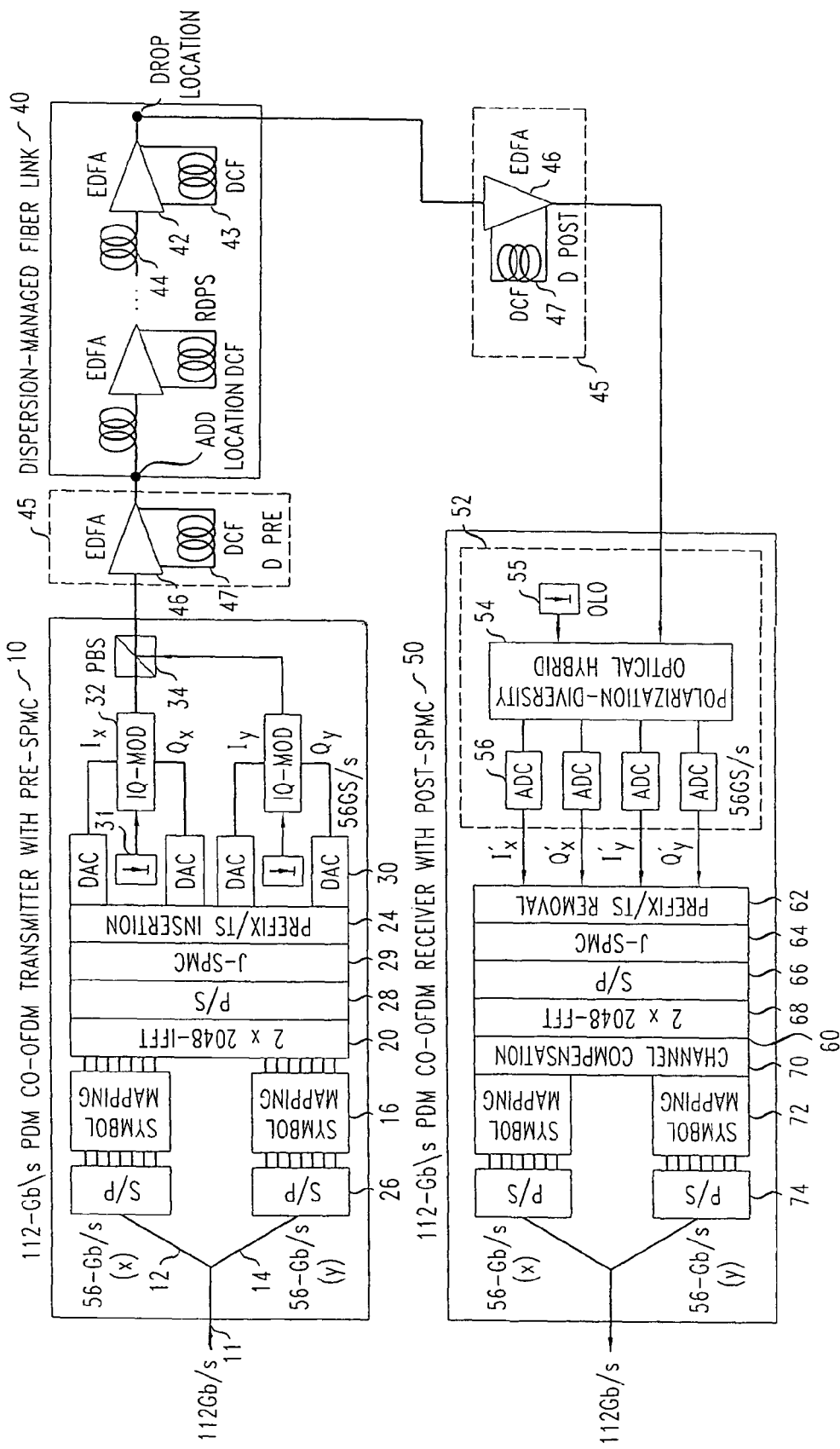

SYSTEM, METHOD AND APPARATUS FOR JOINT SELF PHASE MODULATION COMPENSATION FOR COHERENT OPTICAL POLARIZATION-DIVISION-MULTIPLEXED ORTHOGONAL-FREQUENCY DIVISION-MULTIPLEXING SYSTEMS

FIELD OF THE INVENTION

The invention relates to optical transmission systems, and, in particular, to systems, apparatuses and techniques for compensation of nonlinearity in coherent optical orthogonal frequency-division multiplexing (CO-OFDM) systems.

BACKGROUND INFORMATION

Orthogonal frequency-division multiplexing (OFDM) is a widely used digital modulation/multiplexing technique. Coherent optical orthogonal frequency-division multiplexing (CO-OFDM) is being considered as a promising technology for future high-speed (e.g., 100+-Gb/s per-channel data rate) optical transport systems. In coherent optical orthogonal frequency-division multiplexing (CO-OFDM) systems, fiber nonlinearity imposes a severe limitation on optical transmission performance. For example, the quality of a single-polarization CO-OFDM channel can be severely degraded by self-phase modulation (SPM) when fiber dispersion is neglected or when the transmission link is inline-dispersion-compensated.

Self-phase modulation (SPM) is a nonlinear optical effect of light-matter interaction. An ultrashort pulse of light, when travelling in a medium, will induce a varying refractive index of the medium due to the optical Kerr effect. This variation in refractive index will produce a phase shift in the pulse, leading to a change of the pulse's frequency spectrum.

It has been proposed to improve SPM tolerance for single-polarization CO-OFDM by using digital nonlinearity compensation (DNLC) at the receiver and the transmitter to impose a "negative" phase shift on each OFDM signal sample proportional to its power via a single complex multiplication. It also has been shown that in single-polarization CO-OFDM transmission without dispersion, the SPM effect can be compensated for by applying in the time-domain a phase modulation $\Phi_{comp}(t)$ that is proportional to the signal power $P(t)$ according to $\Phi_{comp}(t) = -\gamma P(t) s L_{eff}$, where $\gamma$ is the fiber nonlinear coefficient in units of $W^{-1}km^{-1}$, s is the number of the fiber spans, and $L_{eff}$ is the effective fiber length of each span in units of km.

Polarization-division multiplexed (PDM) OFDM has been suggested for high spectral-efficiency 100+-Gb/s transmission. In PDM-OFDM, there are two orthogonal polarization components for each signal. However, existing methods for improving SPM nonlinear tolerance for a PDM-OFDM signal are lacking.

SUMMARY OF THE INVENTION

Self phase modulation (SPM) tolerance in high-speed optical transmission that uses polarization-division multiplexed (PDM) coherent optical orthogonal frequency-division multiplexing (CO-OFDM) is desirable. System, method and apparatus embodiments are provided for improving the tolerance to fiber nonlinearity, specifically SPM, in PDM-OFDM systems. These exemplary embodiments include steps and structure to perform joint self phase modulation compensation (J-SPMC). An optical PDM-OFDM signal has a complex digital waveform representing the optical field of each of two orthogonal polarization components. The first orthogonal polarization component is represented by a first digital waveform and the second orthogonal polarization component is represented by a second digital waveform. An exemplary method embodiment for optical communication with J-SPMC includes compensating the first digital waveform representing the first orthogonal polarization component of an optical PDM-OFDM signal based on the first digital waveform and the second digital waveform which represents the second orthogonal polarization component of the optical PDM-OFDM signal.

Further exemplary methods may also include transmitting a first orthogonal polarization component of a PDM-OFDM signal using the compensated first digital waveform representing the first orthogonal polarization component, thus pre-compensating the PDM-OFDM signal prior to its transmission. Other exemplary methods may further include receiving a PDM-OFDM signal and compensating a digital waveform representing one of the orthogonal polarization components of the received PDM-OFDM signal based on digital waveforms representing both of the two orthogonal polarization components of the received PDM-OFDM signal, thus post-compensating the PDM-OFDM signal after its reception.

The compensating in one embodiment may include imposing on the first digital waveform a time varying phase modulation based on an anticipated mean total nonlinear phase shift of the PDM-OFDM signal during fiber transmission. Further embodiments may also compensate the second digital waveform representing the second orthogonal polarization component based on both the second and the first digital waveforms. In this manner, digital waveforms representing the two orthogonal polarization components of an optical PDM-OFDM signal are compensated.

The anticipated mean total nonlinear phase shift of the optical PDM-OFDM signal due to self-phase modulation (SPM) during fiber transmission, denoted herein as $\overline{\Phi}_{SPM}$, can be expressed as, $\overline{\Phi}_{SPM} = \gamma[\overline{P_x(t)} + \overline{P_y(t)}]sL_{eff}$, for a transmission link with s identical spans, each span having an effective length $L_{eff}$. $\gamma$ is the commonly used fiber nonlinear coefficient in units of $W^{-1}km^{-1}$, $\overline{P_x(t)}$ and $\overline{P_y(t)}$ are respectively the mean optical powers, averaged over time t, of the first and the second orthogonal polarization components in units of W.

In another method embodiment, the compensation of a digital waveform representing a polarization component may be based on imposing on the digital waveform a time-varying phase modulation to account for an anticipated time-varying nonlinear phase shift experienced by the optical PDM-OFDM signal during fiber transmission as follows $$\Phi_{comp\,x(y)}^{TX(RX)}(t) \approx -a_1[P_{x(y)}^{TX(RX)}(t) + bP_{y(x)}^{TX(RX)}(t)]\overline{\Phi}_{SPM},$$

where x and y respectively denote orthogonal x- and y-polarization components respectively, TX and RX respectively denote that the orthogonal polarization components defined by a PDM-OFDM transmitter and a PDM-OFDM receiver respectively, $P_{x(y)}^{TX(RX)}(t)$ is the normalized dimensionless signal power waveform for the x(y)-polarization defined by the PDM-OFDM transmitter (PDM-OFDM receiver) that is normalized by the sum of the mean powers of the two digital waveforms, $\overline{\Phi}_{SPM}$ is the anticipated mean total nonlinear phase shift experienced by the signal during fiber transmission due to SPM, and $a_1$ and b are dimensionless parameters.

The range of dimensionless parameter $a_1$ may vary between approximately 0 and approximately 1 and is approximately 0.5 in one embodiment, while dimensionless parameter b may be approximately $\frac{2}{3}$ in another embodiment. Other parameters values may be utilized.

An exemplary method may include compensating the optical PDM-OFDM signal via an optical dispersion compensation arrangement. The optical dispersion compensation arrangement may include an optical pre-dispersion compensation module that provides dispersion, $D_{pre}$, such that a power-weighted dispersion of the first half of a transmission link over which the optical PDM-OFDM signal is transmitted is approximately zero. The optical dispersion compensation arrangement may include an optical post-dispersion compensation module that provides dispersion, $D_{post}$, such that the power-weighted dispersion of a second half of a transmission link over which the optical PDM-OFDM is transmitted approximates the net dispersion experienced by the PDM-OFDM signal at a PDM-OFDM receiver. Other system embodiments may include both pre-dispersion and post-dispersion compensation modules. In addition, the optical dispersion compensation arrangement may include distributed inline dispersion compensation modules.

Embodiments of an optical communication system according the disclosed invention include a PDM-OFDM transmitter that includes a compensation module for imposing a time-varying phase modulation on a first digital waveform representing one of two orthogonal polarization components of an optical PDM-OFDM signal to be transmitted, the time-varying phase modulation based on the first digital waveform which represents a first orthogonal polarization component of the optical PDM-OFDM signal to be transmitted and based on a second digital waveform representing a second orthogonal polarization component of the optical PDM-OFDM signal to be transmitted. The compensation module may include other of the features detailed with respect to the disclosed method. For example, in further embodiments the time varying phase modulation imposed by the compensation module is based on an anticipated nonlinear phase shift of the PDM-OFDM signal during fiber transmission.

Additional system embodiments include a pre-dispersion compensation module associated with the PDM-OFDM transmitter, the pre-dispersion compensation module providing dispersion, $D_{pre}$, to a transmitted optical PDM-OFDM signal and a post-dispersion compensation module for providing a dispersion, $D_{post}$, to the transmitted optical PDM-OFDM signal.

In one embodiment of an optical communication system, a polarization-division multiplexed (PDM) orthogonal frequency-division multiplexed (OFDM) receiver includes a compensation module for imposing a time-varying phase modulation on a first digital waveform representing one of two orthogonal polarization components of a received optical PDM-OFDM signal, the time-varying phase modulation based on the first digital waveform which represents a first orthogonal polarization component of the received optical PDM-OFDM signal and based on a second digital waveform representing a second orthogonal polarization component of the received optical PDM-OFDM signal. The time varying phase modulation imposed by the compensation module of the PDM-OFDM receiver may be based on an anticipated nonlinear phase shift of the PDM-OFDM signal during fiber transmission The fiber transmission of the optical PDM-OFDM signal between the PDM-OFDM transmitter and PDM-OFDM receiver may be over an inline-dispersion-compensated transmission link. Thus, exemplary embodiments may include an inline-dispersion-compensated transmission link that may include one or more optical dispersion compensation modules (DCM). Other embodiments may further include an optical pre-dispersion compensation module and an optical post-dispersion compensation module or some combination thereof. The optical pre-dispersion compensation module may be provisioned to provide a dispersion, $D_{pre}$, such that the power-weighted dispersion of the first half of the transmission link is close to zero. The optical post-dispersion compensation module may be provisioned to provide a dispersion, $D_{post}$, such that the power-weighted dispersion of the second half of the transmission link is close to the net dispersion experienced by the PDM-OFDM signal at a PDM-OFDM receiver.

BRIEF DESCRIPTION OF THE DRAWINGS

Example embodiments will become more fully understood from the detailed description given herein below and the accompanying drawings, wherein like elements are represented by like reference numerals, which are given by way of illustration only and thus are not limiting of the present invention, and wherein FIG. 1 is a schematic diagram of an exemplary optical transmission system that employs joint self phase modulation compensation.

DETAILED DESCRIPTION

Various example embodiments will now be described more fully with reference to the accompanying figures, it being noted that specific structural and functional details disclosed herein are merely representative for purposes of describing example embodiments. Example embodiments may be embodied in many alternate forms and should not be construed as limited to only the embodiments set forth herein.

It will be understood that, although the terms first, second, etc. may be used herein to describe various elements, these elements should not be limited by these terms since such terms are only used to distinguish one element from another. For example, a first element could be termed a second element, and, similarly, a second element could be termed a first element, without departing from the scope of example embodiments. As used herein, the term "and" is used in both the conjunctive and disjunctive sense and includes any and all combinations of one or more of the associated listed items. The singular forms "a", "an" and "the" are intended to include the plural forms as well, unless the context clearly indicates otherwise. It will be further understood that the terms "comprises", "comprising", "includes" and "including", when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which example embodiments belong. It will be further understood that terms, such as those defined in commonly used dictionaries, should be interpreted as having a meaning that is consistent with their meaning in the context of the relevant art and should not be interpreted in an idealized or overly formal sense unless expressly so defined herein.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

FIG. 1 is schematic diagram of an exemplary optical transmission system that employs joint self phase modulation compensation. In the exemplary system 5, a 112-Gb/s PDM-OFDM transmitter 10 is connected via a dispersion managed transmission link 40 to a 112-Gb/s PDM-OFDM receiver setup 60. Other data rate signals can be handled in a similar manner.

At the transmitter 10, the original 112-Gb/s data 11 are first divided into x- and y-polarization branches 12 and 14 each of which is mapped by symbol mapping module 16 onto frequency subcarriers with modulation, which, are transferred to the time domain by an Inverse Fast Fourier Transform (IFFT) supplied by IFFT module 20. For example, each polarization branch 12 or 14 may be mapped onto twelve-hundred-eighty (1280) frequency subcarriers with quadrature phase shift keying (QPSK) modulation, which, together with sixteen (16) pilot subcarriers, are transferred to the time domain by an IFFT of size two-thousand-forty-right (2048) with a filling ratio of approximately sixty-three percent (~63%). The sixteen (16) pilot subcarriers are preferably distributed uniformly in the frequency domain.

A cyclic prefix may be inserted by prefix/TS insertion extension module 24 to accommodate inter-symbol interference which may be caused by chromatic dispersion (CD) and polarization-mode dispersion (PMD) in the optical transmission link 20. For example, a cyclic prefix of length 512 can be used to accommodate dispersion of up to ~20,000 ps/nm, resulting in an OFDM symbol size of 2560.

The IFFT algorithm is organized on a symbol basis requiring a parallelization via a serial-to-parallel module 26 of input data before application of the algorithm and a serialization via parallel-to-serial module 28 afterwards. After parallelization of data in the transmitter a coder is required transferring a binary on-off coding into, for example, a four level phase modulation signal with the phase values of $[\pi/4, 3\pi/4, 5\pi/4, 7\pi/4]$. The Joint SPM Compensation (J-SPMC) module 29 compensates the complex digital waveform representing the first orthogonal polarization component of an optical PDM-OFDM signal based on the first digital waveform and a second digital waveform representing a second orthogonal polarization component of the optical PDM-OFDM signal; the optical PDM-OFDM signal has a complex digital waveform representing each of two orthogonal polarization components. More specifically, the compensation of the digital waveform representing a polarization component may be based on imposing on the digital waveform a time-varying phase modulation to account for an anticipated time-varying nonlinear phase shift experienced by the optical PDM-OFDM signal during fiber transmission.

The superposition of multiple frequency carriers leads to an analog signal in the time domain. Hence a digital-to-analog converter (DAC) 30 is required after serialization in the transmitter and opposite analog-to-digital converter (ADC) 56 in the receiver 50 in front of the digital signal processing. The DAC operates at a given sampling rate. For example, after the time-domain samples corresponding to the real and imaginary parts of one polarization component of the PDM-OFDM signal are serialized they may be converted by two 56-GS/s DACs.

The two analog waveforms converted by the two DACs are used to drive an I/Q modulator 32 to form one polarization component of the PDM-OFDM signal, which is then combined with the other polarization component of the PDM-OFDM signal (generated similarly) by a polarization beam splitter (PBS) 34 to form the original optical PDM-OFDM signal. Each of the two IQ modulators 32 are connected to a laser 31. Prefix/training symbol insertion module 24 may also insert training symbols for use in channel estimation.

In one embodiment, a pair of dual-polarization or polarization multiplexed training symbols may be used so that the overall power of each of the training symbols is the same as that of a PDM-OFDM payload symbol and the overall OFDM symbol sequence is of a constant power format in order to reduce the XPM penalty to other WDM channels caused by a non-uniform power waveform of a wavelength channel as described in U.S. patent application Ser. No. 12/215,740 entitled System, Method And Apparatus For Channel Estimation With Dual Polarization Training Symbols For Coherent Optical OFDM, filed Jun. 20, 2008 and herein incorporated by reference.

In a further embodiment, channel estimation for the CO-OFDM link may be provided utilizing intra-symbol frequency-domain averaging (ISFA) to compensate for transmission impairments. In such an embodiment, a pair of training symbols in an optical OFDM signal are inserted and received, channel estimation performed to obtain a first estimated channel matrix for each of a plurality of subcarriers of the OFDM signal, and the first estimated channel matrix of a first subcarrier averaging with the first estimated channel matrix of at least one other subcarriers to obtain a second estimated channel matrix for the first subcarrier. Channel compensation is performed based on the second estimated channel matrix for the first subcarrier of the OFDM signal and as described in U.S. patent application Ser. No. 12/215,740 entitled System, Method And Apparatus For Channel Estimation Based on Intra-Symbol Frequency Domain Averaging For Coherent Optical OFDM, filed Jun. 20, 2008 and herein incorporated by reference.

The orthogonal frequency-division multiplexed (OFDM) signal is carried via a transmission link 40 to a 112-Gb/s PDM-OFDM receiver 50. The optical link may be an inline dispersion compensated transmission link and include a number of Erbium-doped fiber amplifiers (EDFA) 42 and corresponding inline dispersion compensation modules made of dispersion compensating fibers (DCF) 43 for amplifying and compensating the signal during its transport over a number of fiber spans 44. With the use of distributed inline dispersion compensators, the residual dispersion per transmission span (RDPS) after dispersion compensation can be reduced to a value that is much smaller than the dispersion value of the each transmission span. Preferably, RDPS is made to be a small value, e.g., <100 ps/nm. The optical link will typically suffer from fiber nonlinearity, self-phase modulation (SPM), chromatic dispersion (CD), and polarization mode dispersion (PMD).

The end-to-end system may also include optical dispersion compensation modules 45, 48, each of which includes an Erbium doped fiber amplifier (EDFA) 46 and corresponding dispersion compensating fiber (DCF) 47. Optical pre-dispersion compensation module 45 provides dispersion, $D_{pre}$, which may be provided such that a power-weighted dispersion of a first portion or the first half of a transmission link over which the optical PDM-OFDM signal is transmitted is approximately zero. Optical post-dispersion compensation module 48 provides dispersion, $D_{post}$. $D_{post}$ is provided such that the power-weighted dispersion of a second portion or half second of a transmission link over which the optical PDM OFDM is transmitted is approximates the net dispersion experienced by the PDM-OFDM signal at a PDM-OFDM receiver. The transmission link is a known distance such that the first and second half can be simply determined from the known transmission distance.

In the presence of fiber dispersion, signal power waveform changes during transmission, making perfect compensation of the SPM effect by signal processing at the transmitter, the receiver, or both impossible. However, judiciously chosen dispersion arrangements or dispersion maps can make the signal waveform change during transmission sufficiently small to allow highly effective J-SPMC. For example, a suitable dispersion map can include an optical pre-dispersion compensation module providing a $D_{pre}$ of −200 ps/nm, and distributed inline dispersion compensation modules providing a RDPS of 25 ps/nm.

At the receiver 50, digital coherent detection with polarization diversity is used to sample the fields of two orthogonal components of the received optical signal at the receiver front end 52. Thus, the receiver front end includes Polarization Diversity Optical Hybrid 54, an optical local oscillator 55 and analog-to-digital converters (ADC) 56. The ADC operates at a predetermined sampling rate, which can be the same as that of the DAC 30.

Symbol synchronization is then performed, and training symbols are extracted for channel estimation that minimizes the detrimental effects such as PMD and CD on each OFDM subcarrier at the receiver digital signal processor (DSP) 60. The receiver DSP includes modules for prefix/training symbol removal 62, Joint SPM Compensation (J-SPMC) 64, parallel-to-serial conversion 66, Fast Fourier Transform (FFT) 68, channel compensation 70, symbol mapping 72, and serial-to-parallel conversion 74 leading to a reconstruction of the original data provided to the transmitter.

At the receiver digital signal processor (DSP) 60, prefix/training symbol removal module 62 extracts training symbols which are used for channel estimation in order to minimize the effects polarization-mode dispersion and chromatic dispersion on each OFDM subcarrier as compensated by channel compensation module 72. Symbol synchronization may also be performed by prefix/training symbol removal module 62.

Channel compensation module 68 may include rough electronic dispersion compensation (EDC) just after FFT module and before compensating based on correlated dual-polarization training symbols (CDPTS-based CE) and Intra-Symbol Frequency Domain Averaging (ISFA-based CE) as described above. Channel compensation module may also provide fine EDC and pilot-assisted common phase error compensation (PA-CPEC).

Optical dispersion compensation or electronic dispersion compensation (EDC) of the received training symbols and/or the received OFDM signal may also be performed in combination with the CDPTS channel estimation. EDC is performed prior to the CDPTS channel estimation of the estimated channel matrix and may be based on a guess of the dispersion experienced by the PDM-OFDM signal. Optical dispersion compensation or electronic dispersion compensation (EDC) of the received training symbols and/or the received OFDM signal may need to be performed before the ISFA procedure.

Descriptions of the Joint SPM Compensation (J-SPMC) module 64 and its method of compensation follow below. In PDM-OFDM transmission, the coupled nonlinear Schrödinger equations (NLSE) governing the two signal polarization components $E_x$ and $E_y$ in linearly birefringent fiber are $$\frac{\partial E_{x(y)}}{\partial z} + \frac{j}{2}\beta_2 \frac{\partial^2 E_{x(y)}}{\partial t^2} + \frac{1}{2}\alpha E_{x(y)} = j\gamma\left[|E_{x(y)}|^2 + \frac{2}{3}|E_{y(x)}|^2\right], \quad (1)$$

where $\beta_2$ and $\alpha$ are respectively the fiber dispersion and loss coefficients, and x(y) denotes the x(y) polarization component respectively. Thus, the SPM effect experienced by one polarization component not only has a contribution from the optical power of this polarization, but also has a contribution from the optical power of the other polarization with a different scaling factor as can be identified from Eq. (1).

In order to effectively compensate for the SPM effect for PDM-OFDM, the joint SPM compensation (J-SPMC) method considers both polarization components when calculating $\Phi_{comp}^{x(y)}(t)$, the compensating phase modulation for each polarization as follows $$\Phi_{comp}^{x(y)}(t) = -\gamma\left[P_{x(y)}(t) + \frac{2}{3}P_{y(x)}(t)\right]sL_{eff}, \quad (2)$$

where $\gamma$ is the fiber nonlinear coefficient, s is the number of the fiber spans, $L_{eff}$ is the effective fiber length of each span, and $P_{x(y)}$ is the signal power waveform for the x or y polarization respectively. The above $\Phi_{comp}^{x(y)}(t)$ is the optimum compensating phase modulation when fiber dispersion effect is neglected. With the consideration of fiber dispersion, the magnitude of the compensating phase modulation may need to be reduced.

Joint SPM compensation (J-SPMC) may be realized by imposing phase modulations at the transmitter (TX) 10, following the IFFT process, and at the receiver (RX) 50, prior to the FFT process. The time-varying phase modulation imposed on the digital waveform representing a polarization component at the transmitter can be generally expressed as $$\Phi_{comp}^{TX,x(y)}(t) \approx -a[P_{x(y)}^{TX}(t) + bP_{y(x)}^{TX}(t)]\overline{\Phi}_{SPM}, \quad (3)$$

where x and y respectively denote to the orthogonal x- and y-polarization components defined by the PDM-OFDM transmitter denoted TX, $P_{x(y)}^{TX}(t)$ is the normalized dimensionless signal power waveform of the digital waveform representing the transmitted x(y)-polarization component that is normalized by the sum of the mean powers of the two digital waveforms representing the x- and y-polarization components of the PDM-OFDM signal to be transmitted, $\overline{\Phi}_{SPM}$ is the anticipated mean total nonlinear phase shift experienced by the signal during fiber transmission due to SPM at the PDM-OFDM transmitter, and a and b are two dimensionless parameters.

For a transmission link with s identical spans, each span having an effective length $L_{eff}$, and a fiber nonlinear coefficient $\gamma$, $\overline{\Phi}_{SPM} \approx \gamma[\overline{P_x(t)} + \overline{P_y(t)}]sL_{eff}$, wherein, $\overline{P_x(t)}$ and $\overline{P_y(t)}$ are respectively the mean optical powers, averaged over time t, of the first and the second orthogonal polarization components in units of W.

Similarly, when compensating a digital waveform representing a polarization component at the receiver, the time-varying phase modulation imposed is $$\Phi_{comp}^{RX,x(y)}(t) = -a[P_{x(y)}^{RX}(t) + bP_{y(x)}^{RX}(t)]\overline{\Phi}_{SPM}, \quad (4)$$

where x and y respectively denote to the orthogonal x- and y-polarization components defined by the PDM-OFDM receiver, denoted RX, $P_{x(y)}^{RX}(t)$ is the normalized dimensionless signal power waveform of the digital waveform representing the received x(y)-polarization component that is normalized by the sum of the mean powers of the two digital waveforms representing the x- and y-polarization components of the received PDM-OFDM signal, $\overline{\Phi}_{SPM}$ is the anticipated mean total nonlinear phase shift experienced by the signal during fiber transmission due to SPM at the PDM-OFDM receiver, and a and b are two dimensionless parameters. The mean anticipated nonlinear phase shift experienced by the signal during fiber transmission due to SPM can be estimated through iteration. The modulation provided by the method accounts for an anticipated nonlinear phase shift experienced by the optical PDM-OFDM signal during fiber transmission.

For modulation at transmitter and receiver, the range of dimensionless parameter a may vary between approximately 0 and approximately 1 and is approximately 0.5 in one embodiment, while dimensionless parameter b is may be approximately ⅔ in another embodiment. Other parameters values may be utilized, while it is noted that the values of a parameter at transmitter and receiver need not be equal, that is different values may be utilized at transmitter and receiver.

Note that the x(y)-polarizations are defined by the transmitter and receiver polarization beam splitters (PBS's). Random rotation of the polarization fields during fiber transmission generally causes the x(y)-polarizations defined by the transmitter PBS to be different from those defined by the receiver PBS.

In one embodiment, the J-SPMC method is performed at both the transmitter and receiver of a PDM CO-OFDM signal. At the transmitter, the J-SPMC compensates SPM for the x-polarization component of the signal field, by imposing a time-varying phase modulation according to $\Phi_{comp}^{TX,x}(t)$. At the same time, the J-SPMC may also compensates SPM for the y-polarization component of the signal field, by imposing a time-varying phase modulation according to $\Phi_{comp}^{TX,y}(t)$. Likewise, at the receiver, the J-SPMC compensates SPM for the detected x-polarization component of the signal field, by imposing a time-varying phase modulation according to $\Phi_{comp}^{Rx,x}(t)$. At the same time, the J-SPMC may also compensates SPM for the y-polarization component of the signal field, by imposing a time-varying phase modulation according to $\Phi_{comp}^{RX,y}(t)$.

It is noted that the J-SPMC method is computationally efficient, and its necessary computational effort is negligibly small as compared to that required for the IFFT or FFT process.

From the FFT module 68 is obtained a channel matrix which is further compensated by channel compensation module 70. The obtained channel matrices at different subcarrier frequencies are inverted and applied to the subcarriers in the payload symbols for channel compensation that realizes polarization de-multiplexing, and compensation of PMD, CD, and/or PDL. The other signal processes needed to recover the original data are performed by other modules identified above and the transmitted signal is recovered for each subcarrier.

In a depending embodiment, as mentioned above, optical pre-dispersion compensation ($D_{pre}$) and post-dispersion compensation ($D_{post}$) are used before and after the signal transmission through the dispersion-managed fiber link (DMFL) with distributed inline dispersion compensation modules, each of which produces a certain residual dispersion per span (RDPS), to further improve the effectiveness of the J-SPMC. $D_{pre}$ is chosen such that the power-averaged dispersion of the first half of the DMFL is about zero, and $D_{post}$ is chosen such that the power-averaged dispersion of the second half of the DMFL is about the net dispersion experienced by the signal at the receiver. RDPS is preferably chosen to be a small value, e.g., <100 ps/nm.

All of the functions described above with respect to the J-SPMC method are readily carried out by special or general purpose digital information processing devices acting under appropriate instructions embodied, e.g., in software, firmware, or hardware programming. For example, functional modules of the DSP and the other logic circuits can be implemented as an ASIC (Application Specific Integrated Circuit) constructed with semiconductor technology and may also be implemented with FPGA (Field Programmable Gate Arrays) or any other hardware blocks.

What is claimed is:

1. A method comprising:
   compensating a first complex digital waveform representing one of two orthogonal polarization components of an optical polarization-division multiplexed (PDM) orthogonal frequency-division multiplexed (OFDM) signal, a first digital waveform representing a first orthogonal polarization component of the optical PDM-OFDM signal and a second digital waveform representing a second orthogonal polarization component of the optical PDM-OFDM signal, said compensating of the first complex digital waveform being based on the first digital waveform and the second digital waveform and an anticipated mean total nonlinear phase shift experienced by the optical PDM-OFDM signal during fiber transmission.

2. The method of claim 1 further comprising
   compensating a second complex digital waveform representing the second orthogonal polarization component of the optical PDM-OFDM signal based on the second digital waveform and the first digital waveform and the anticipated mean total nonlinear phase shift experienced by the optical PDM-OFDM signal during fiber transmission.

3. The method of claim 1 wherein said compensating of the first complex digital waveform is based on an anticipated mean total nonlinear phase shift of the optical PDM-OFDM signal due to self-phase modulation (SPM) during fiber transmission.

4. The method of claim 3 wherein the anticipated mean total nonlinear phase shift of the optical PDM-OFDM signal due to SPM during fiber transmission is denoted by $\Phi_{SPM}$, wherein, $\Phi_{SPM}=\gamma[\overline{P_x(t)}+\overline{P_y(t)}]sL_{eff}$ for a transmission link with s identical spans, each span having an effective length $L_{eff}$, wherein $\gamma$ is the nonlinear coefficient of the transmission fiber, and wherein $\overline{P_x(t)}$ and $\overline{P_y(t)}$ are respectively the mean optical powers, averaged over time t, of the first and the second orthogonal polarization components of the optical PDM-OFDM signal.

5. The method of claim 1 wherein said compensating is based on a first normalized dimensionless signal power waveform of the first complex digital waveform and a second normalized dimensionless signal power waveform of the second complex digital waveform, and wherein the first normalized dimensionless signal power waveform corresponds to the square of the absolute value of the first complex digital waveform normalized to the sum of the mean powers of the first and the second digital waveforms, and wherein the second normalized dimensionless signal power waveform corresponds to the square of the absolute value of the second complex digital waveform normalized to the sum of the mean powers of the first and the second digital waveforms.

6. The method of claim 1 further comprising:
   transmitting a compensated optical PDM-OFDM signal, an orthogonal polarization component of the compensated optical PDM-OFDM signal represented by the compensated first complex digital waveform.

7. The method of claim 1 wherein said compensating is performed on a complex digital waveform representing one of the orthogonal polarization components defined in a PDM-OFDM transmitter based on digital waveforms representing the two orthogonal polarization components; the method further comprising:

generating a polarization component of the PDM-OFDM optical signal using the compensated complex digital waveform.

8. The method of claim 1 further comprising:
digitizing each of the two orthogonal polarization components of the PDM-OFDM optical signal defined by a PDM-OFDM receiver; wherein said compensating is performed on the first complex digital waveform representing one of the orthogonal polarization components based on the two digital waveforms representing the orthogonal polarization components.

9. The method of claim 1 wherein compensating comprises imposing on the first complex digital waveform a time-varying phase modulation as follows $$\Phi_{comp}^{TX(RX),x(y)}(t) \approx -a[P_{x(y)}^{TX(RX)}(t)+bP_{y(x)}^{TX(RX)}(t)]\overline{\Phi}_{SPM},$$

where x and y respectively denote orthogonal x- and y-polarization components, TX and RX respectively denote orthogonal polarization components defined by a PDM-OFDM transmitter and a PDM-OFDM receiver, $P_{x(y)}^{TX(RX)}(t)$ is a normalized dimensionless signal power waveform for the x(y)-polarization defined by the PDM-OFDM transmitter (PDM-OFDM receiver) that is normalized by a sum of the mean powers of the two complex digital waveforms, $\overline{\Phi}_{SPM}$ is the anticipated mean total nonlinear phase shift experienced by the signal during fiber transmission due to SPM, and a and b are dimensionless parameters.

10. The method of claim 9 wherein the dimensionless parameter a is approximately 0.5.

11. The method of claim 9 wherein the dimensionless parameter b is approximately ⅔.

12. The method of claim 1 further comprising compensating the optical PDM-OFDM signal by at least one optical dispersion compensation module.

13. The method of claim 12 wherein at least one of the optical dispersion compensation modules is an optical pre-dispersion compensation module that provides a dispersion, $D_{pre}$, such that a power-weighted dispersion of a first portion of a transmission link over which the optical PDM-OFDM signal is transmitted is approximately zero.

14. The method of claim 12 wherein at least one of the optical dispersion compensation modules is an optical post-dispersion compensation module that provides a dispersion, $D_{post}$, such that the power-weighted dispersion of a second portion of a transmission link over which the optical PDM OFDM is transmitted is approximately a net dispersion experienced by the optical PDM-OFDM signal at a PDM-OFDM receiver.

15. The method of claim 12 wherein at least one of the optical dispersion compensation modules is an inline dispersion compensation module which produces a residual dispersion per span (RDPS) of less than about 100 ps/nm.

16. An optical communication apparatus comprising:
a polarization-division multiplexed (PDM) orthogonal frequency-division multiplexed (OFDM) transmitter, the PDM-OFDM transmitter comprising
a compensation module for imposing a time-varying phase modulation on a first complex digital waveform representing one of two orthogonal polarization components of an optical PDM-OFDM signal to be transmitted, the time-varying phase modulation based on the first complex digital waveform which represents a first orthogonal polarization component of the optical PDM-OFDM signal to be transmitted, a second complex digital waveform representing a second orthogonal polarization component of the optical PDM-OFDM signal to be transmitted, and an anticipated nonlinear phase shift experienced by the optical PDM-OFDM signal during fiber transmission.

17. The optical communication apparatus of claim 16 wherein the time-varying phase modulation imposed by the compensation module is $$\Phi_{comp}^{TX(RX),x(y)}(t) \approx -a[P_{x(y)}^{TX(RX)}+bP_{x(y)}^{TX(RX)}(t)]\overline{\Phi}_{SPM},$$

where x and y respectively denote orthogonal x- and y-polarization components, TX and RX respectively denote orthogonal polarization components defined by a PDM-OFDM transmitter and a PDM-OFDM receiver, $P_{x(y)}^{TX(RX)}(t)$ is a normalized dimensionless signal power waveform for the x(y)-polarization defined by the PDM-OFDM transmitter (PDM-OFDM receiver) that is normalized by a sum of the mean powers of the two complex digital waveforms, $\overline{\Phi}_{SPM}$ is the anticipated mean total nonlinear phase shift experienced by the signal during fiber transmission due to SPM, and a and b are dimensionless parameters.

18. The optical communication apparatus of claim 16 further comprising
a pre-dispersion compensation module associated with the PDM-OFDM transmitter, the pre-dispersion compensation module providing a dispersion, $D_{pre}$, to a transmitted optical PDM-OFDM signal.

19. The optical communication apparatus of claim 16 further comprising
an inline dispersion compensation module for producing a residual dispersion per span (RDPS) of less than about 100 ps/nm.

20. An optical communication apparatus comprising:
a polarization-division multiplexed (PDM) orthogonal frequency-division multiplexed (OFDM) receiver, the PDM-OFDM receiver comprising
a compensation module for imposing a time-varying phase modulation on a first complex digital waveform representing one of two orthogonal polarization components of a received optical PDM-OFDM signal, the time-varying phase modulation based on the first complex digital waveform which represents a first orthogonal polarization component of the received optical PDM-OFDM signal, a second complex digital waveform representing a second orthogonal polarization component of the received optical PDM-OFDM signal, and an anticipated mean total nonlinear phase shift experienced by the optical PDM-OFDM signal during fiber transmission.

\* \* \* \* \*